(12) United States Patent
Ramos et al.

(10) Patent No.: US 10,277,396 B2
(45) Date of Patent: Apr. 30, 2019

(54) WATERMARKING FOR DATA INTEGRITY

(71) Applicant: General Electric Company, Schenectady, NY (US)

(72) Inventors: Luis Ramos, San Ramon, CA (US); Venkatesh Sivasubramanian, San Ramon, CA (US); Sriramakrishna Yelisetti, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 177 days.

(21) Appl. No.: 15/184,739

(22) Filed: Jun. 16, 2016

(65) Prior Publication Data

US 2017/0366356 A1 Dec. 21, 2017

(51) Int. Cl.
*H04L 29/06* (2006.01)
*H04L 9/08* (2006.01)
*H04L 9/06* (2006.01)

(52) U.S. Cl.
CPC .......... *H04L 9/0861* (2013.01); *H04L 9/0637* (2013.01); *H04L 9/0894* (2013.01); *H04L 2209/608* (2013.01); *H04L 2209/805* (2013.01)

(58) Field of Classification Search
CPC .................................................... H04L 9/3247
USPC ......................................................... 713/176
See application file for complete search history.

(56) References Cited

U.S. PATENT DOCUMENTS

| | | | | |
|---|---|---|---|---|
| 9,124,573 B2* | 9/2015 | Chastain | ............. | H04L 63/0807 |
| 9,407,650 B2* | 8/2016 | Niemela | ............. | H04L 63/1425 |
| 9,635,021 B2* | 4/2017 | Smith | ................. | H04L 63/0853 |
| 10,079,898 B2* | 9/2018 | Lau | .......... | H04L 67/18 |
| 10,176,246 B2* | 1/2019 | Dang | ..................... | G06F 17/18 |
| 2012/0003983 A1* | 1/2012 | Sherlock | ................ | H04L 41/08 455/450 |
| 2012/0070002 A1* | 3/2012 | Smith | ..................... | H04L 9/085 380/277 |
| 2013/0336316 A1* | 12/2013 | Sudhaakar | .............. | H04L 45/16 370/390 |
| 2014/0222813 A1* | 8/2014 | Yang | ....................... | G06F 16/95 707/736 |
| 2014/0344269 A1* | 11/2014 | Dong | ..................... | H04L 67/12 707/736 |
| 2015/0067343 A1* | 3/2015 | Grobman | .............. | H04L 9/3247 713/176 |
| 2015/0071139 A1* | 3/2015 | Nix | .................. | H04W 52/0235 370/311 |
| 2015/0095648 A1* | 4/2015 | Nix | ........................ | H04W 4/70 713/170 |

(Continued)

OTHER PUBLICATIONS

"Protecting Endpoint Devices in IoT Supply Chain", Authors Kun Yang, Domenic Forte, Mark M Tehranipoor, Publication date Nov. 2, 2015, Conference Proceedings of the IEEE/ACM International Conference on Computer-Aided Design.*

*Primary Examiner* — Harris C Wang
(74) *Attorney, Agent, or Firm* — Buckley, Maschoff & Talwalkar LLC

(57) ABSTRACT

Methods, systems, and apparatus for ensuring data integrity are disclosed. A data container structure is obtained, the data container structure containing data and a source identifier of a first hardware component. The data container structure is modified, using a header processing device, to include a component signature and an identifier of a second hardware component.

20 Claims, 9 Drawing Sheets

(56) References Cited

U.S. PATENT DOCUMENTS

| | | | |
|---|---|---|---|
| 2015/0163236 A1* | 6/2015 | Niemela | H04L 63/1425 |
| | | | 726/23 |
| 2015/0229654 A1* | 8/2015 | Perier | H04W 12/06 |
| | | | 726/3 |
| 2016/0182475 A1* | 6/2016 | Uzun | H04L 63/062 |
| | | | 713/171 |
| 2016/0182497 A1* | 6/2016 | Smith | H04L 63/0853 |
| | | | 713/156 |
| 2016/0205106 A1* | 7/2016 | Yacoub | H04L 61/1511 |
| | | | 726/28 |
| 2016/0294829 A1* | 10/2016 | Angus | H04L 63/0876 |
| 2016/0295383 A1* | 10/2016 | Yang | H04W 4/70 |
| 2017/0006595 A1* | 1/2017 | Zakaria | H04L 67/12 |
| 2017/0060574 A1* | 3/2017 | Malladi | G06F 8/70 |
| 2017/0149792 A1* | 5/2017 | Smith | H04L 9/3263 |
| 2017/0187590 A1* | 6/2017 | Cook | H04L 43/08 |
| 2017/0235603 A1* | 8/2017 | Baughman | H04W 4/70 |
| | | | 718/105 |
| 2017/0293757 A1* | 10/2017 | Rosenman | G06F 21/552 |

* cited by examiner

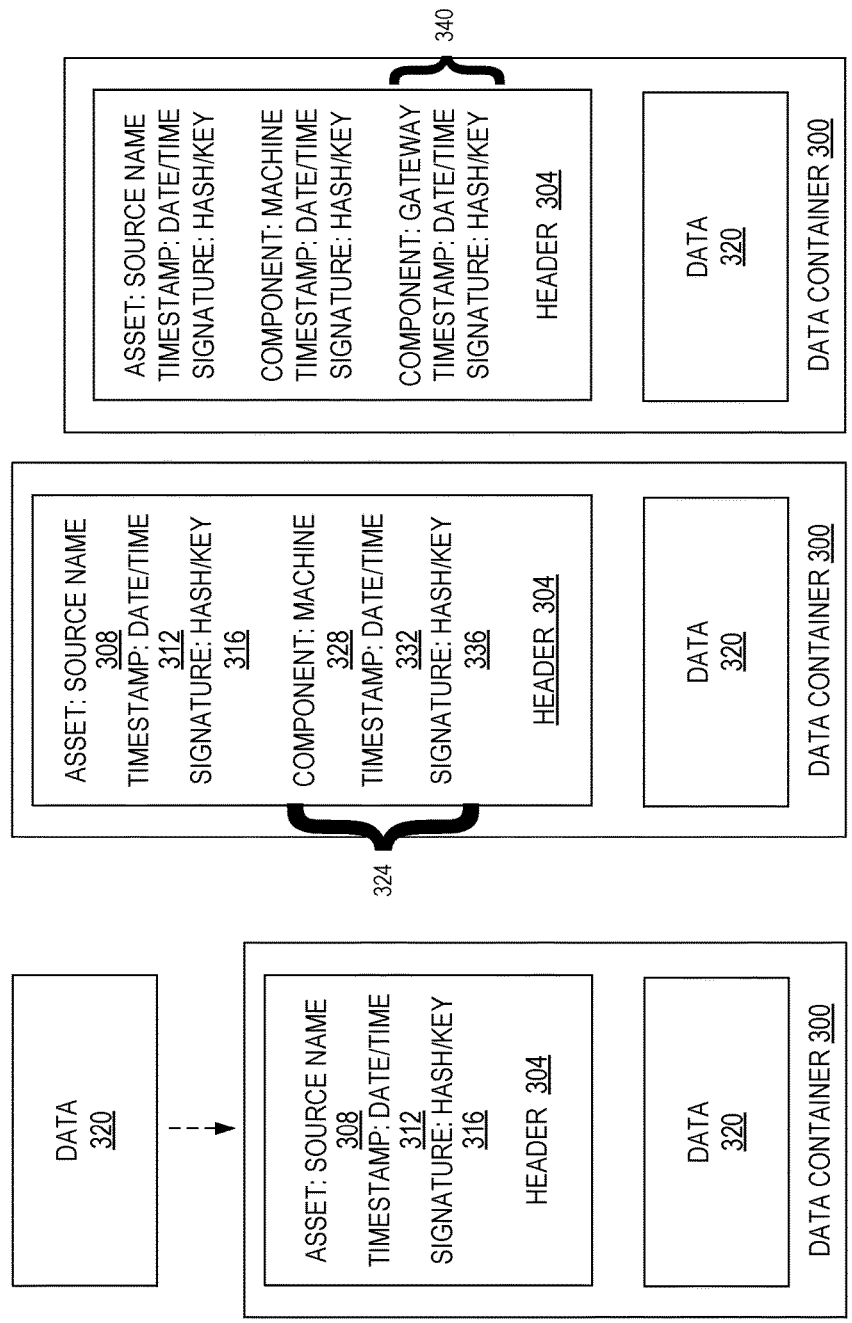

WATERMARKING FOR DATA INTEGRITY

TECHNICAL FIELD

This application relates generally to data protection. More particularly, this application relates to watermarking data for ensuring data integrity.

BACKGROUND

The traditional Internet of Things (IoT) involves the connection of various consumer devices, such as coffee pots and alarm clocks, to the Internet to allow for various levels of control and automation of those devices. The Industrial Internet of Things (IIoT), on the other hand, involves connecting industrial assets as opposed to consumer devices. There are technical challenges involved in interconnecting diverse industrial assets, such as wind turbines, jet engines, and locomotives, that simply do not exist in the realm of consumer devices. Data integrity is an important aspect of connecting and managing such industrial assets in an Industrial Internet environment.

BRIEF DESCRIPTION OF DRAWINGS

The present disclosure is illustrated by way of example and not limitation in the figures of the accompanying drawings, in which like references indicate similar elements and in which:

FIG. 3A-3C are representations of a data container for transporting and storing IIoT data, in accordance with an example embodiment.

DETAILED DESCRIPTION

Overview

Figure 1:
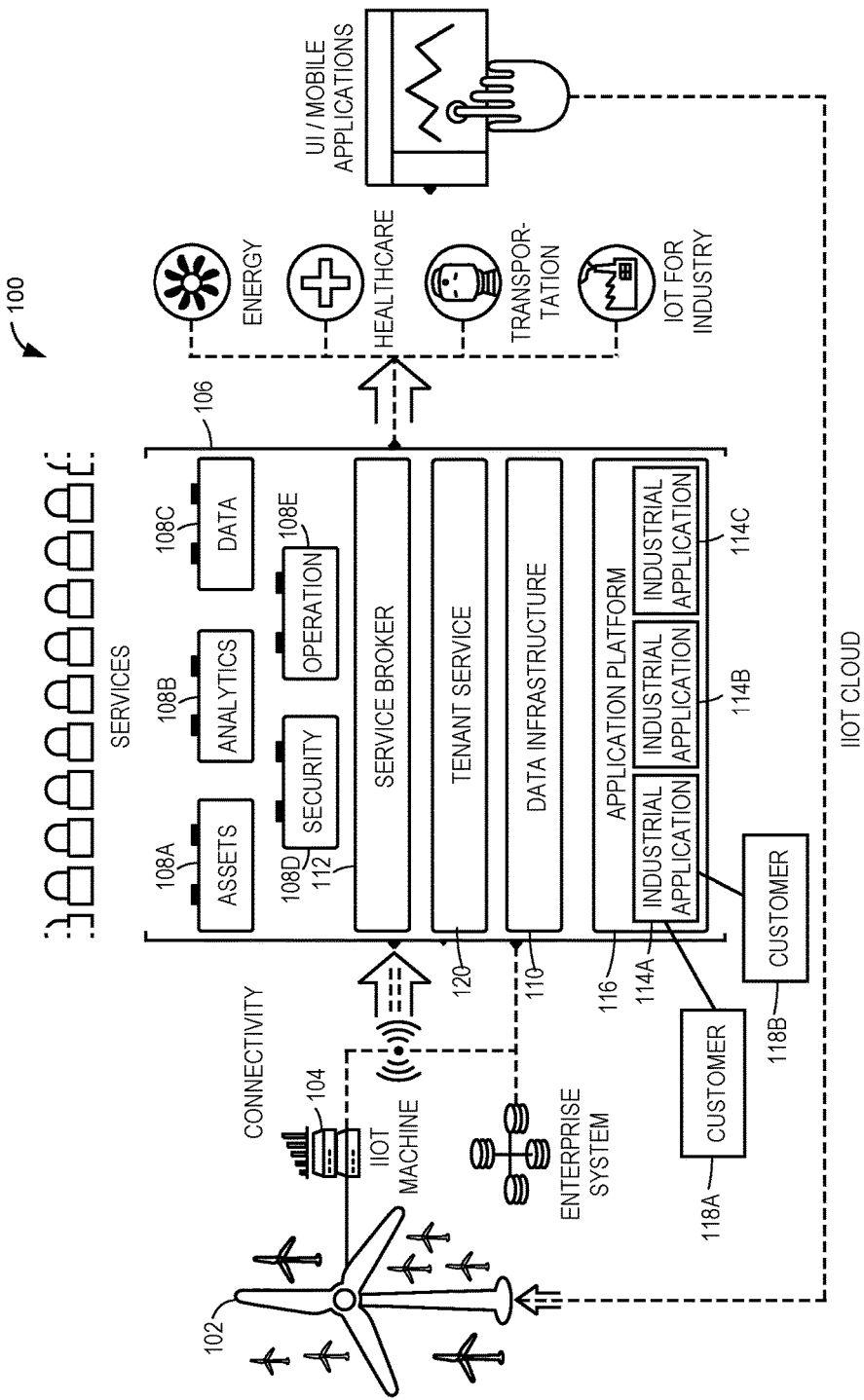
FIG. 1 is a block diagram illustrating a system, in accordance with an example embodiment, implementing an IIoT.

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Some of the technical challenges involved in an IIoT include items such as predictive maintenance, where industrial assets can be serviced prior to problems developing in order to reduce unplanned downtimes. As such, one such technical challenge involves prediction of when industrial assets or parts thereon will fail. In an example embodiment, an IIoT may be designed that monitors data collected from sensors and, using physics-based analytics, detects potential error conditions based on an asset model. The asset in question can then be gracefully shut down for maintenance at the appropriate time. In addition to these types of edge applications (applications involving the industrial assets directly), the IIoT may also pass the sensor data to a cloud environment where operational data for all similar machines under management can be stored and analyzed. Over time, data scientists can discover new patterns and create new and improved physics-based analytical models. The new analytical model can then be pushed back to all of the assets, effectively improving the performance of all assets simultaneously.

In an example embodiment, a new concept of data watermarking and stamping to ensure data integrity is disclosed. Ensuring data integrity includes detecting data errors, detecting an access or modification of data by an unauthorized entity, and the like. In order to ensure that data is not erroneously or maliciously modified, a signature is added to a data container that contains the data to be transported and stored. The signature is generated, for example, by applying a hash function to the data content of the data container. The signature may be used to verify the integrity of the data content.

In addition to the signature, the data container may comprise other metadata associated with the data content of the container. For example, a component identifier may be added to the data container by each component that the data container traverses in a network of components (the IIoT); the component identifiers may be used to verify the path of components that the data container passed through. The data container may be stored with the signature, the component identifiers, or both to enable verification of the integrity of the data when the data is accessed in the future. In one example embodiment, the data content, data container, or both are encrypted to prevent the data from being read by an unauthorized user, unauthorized component, and the like. In one embodiment, Transport Layer Security is utilized for transmission of the data container.

FIG. 1 is a block diagram illustrating a system 100, in accordance with an example embodiment, implementing an IIoT. An industrial asset 102, such as a wind turbine as depicted here, may be directly connected to an IIoT machine 104. The IIoT machine 104 includes a software stack that can be embedded into hardware devices such as industrial control systems or network gateways. The software stack may include its own software development kit (SDK). The SDK includes functions that enable developers to leverage the core features described below.

One responsibility of the IIoT machine 104 is to provide secure, bi-directional cloud connectivity to, and management of, industrial assets, while also enabling applications (analytical and operational services) at the edge of the IIoT. The latter permits the delivery of near-real-time processing in controlled environments. Thus, the IIoT machine 104 connects to an IIoT cloud 106, which includes various modules, including asset module 108A, analytics module 108B, data module 108C, security module 108D, and operations module 108E, as well as data infrastructure 110. This allows other computing devices, such as client computers, running user interfaces/mobile applications to perform various analyses of either the individual industrial asset 102 or assets of the same type.

The IIoT machine 104 also provides security, authentication, and governance services for endpoint devices. This allows security profiles to be audited and managed centrally across devices, ensuring that assets are connected, controlled, and managed in a safe and secure manner, and that critical data is protected.

Figure 2:
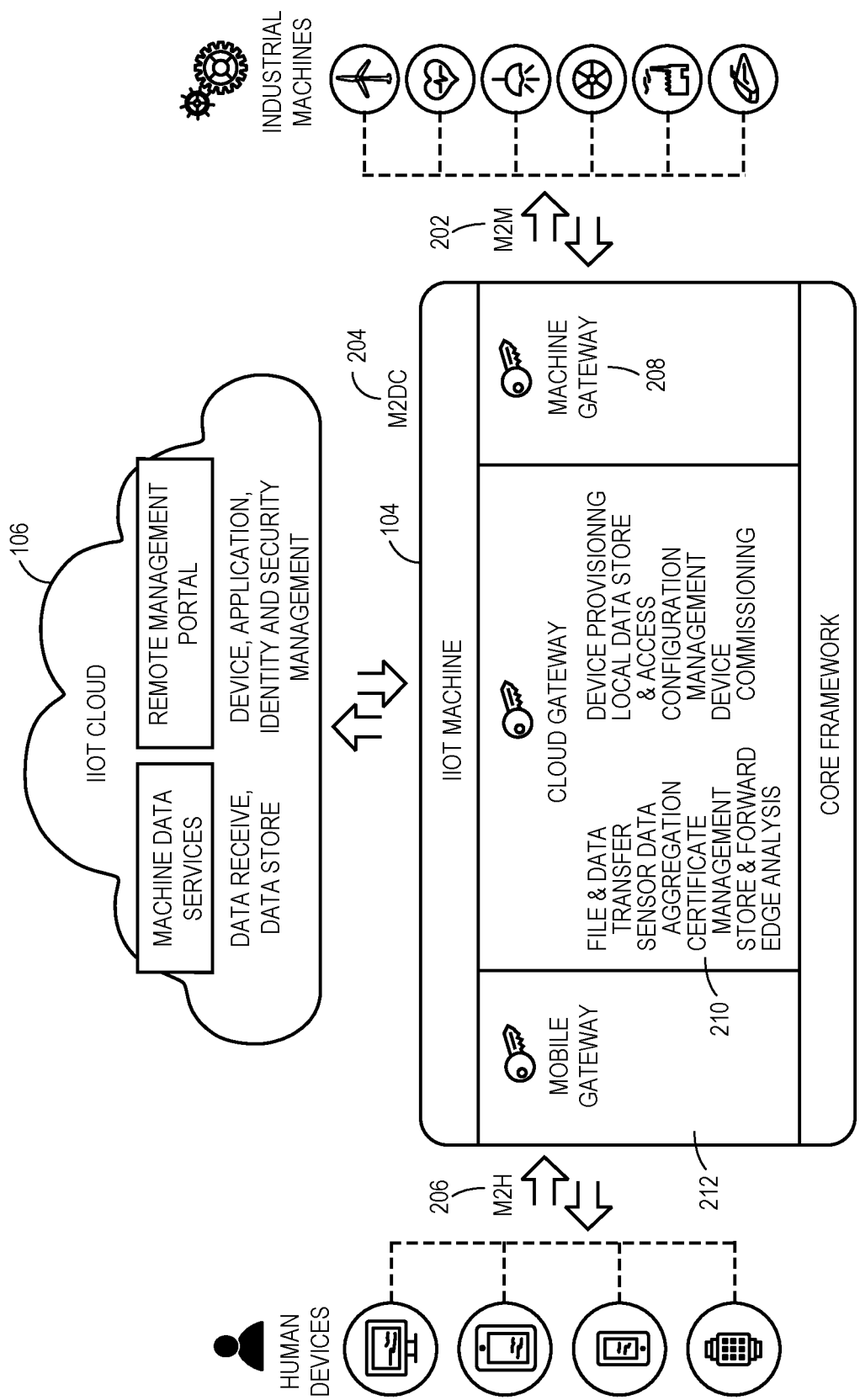
FIG. 2 is a block diagram illustrating different edge connectivity options that an IIoT machine provides, in accordance with an example embodiment.

In order to meet requirements for industrial connectivity, the IIoT machine 104 can support gateway solutions that connect multiple edge components via various industry standard protocols. FIG. 2 is a block diagram illustrating different edge connectivity options that an IIoT machine 104 provides, in accordance with an example embodiment. There are generally three types of edge connectivity options that an IIoT machine 104 provides: machine gateway (M2M) 202, cloud gateway (M2DC) 204, and mobile gateway (M2H) 206.

Many assets may already support connectivity through industrial protocols such as Open Platform Communication (OPC)-UA or ModBus. A machine gateway component 208 may provide an extensible plug-in framework that enables connectivity to assets via M2M 202 based on these common industrial protocols.

A cloud gateway component 210 connects an IIoT machine 104 to an IIoT cloud 106 via M2DC.

A mobile gateway component 212 enables people to bypass the IIoT cloud 106 and establish a direct connection to an asset 102. This may be especially important for maintenance scenarios. When service technicians are deployed to maintain or repair machines, they can connect directly from their machine to understand the asset's operating conditions and perform troubleshooting. In certain industrial environments, where connectivity can be challenging, the ability to bypass the cloud and create this direct connection to the asset may be critical.

As described briefly above, there are a series of core capabilities provided by the IIoT system 100. Industrial scale data, which can be massive and is often generated continuously, cannot always be efficiently transferred to the cloud for processing, unlike data from consumer devices. Edge analytics provide a way to preprocess the data so that only the pertinent information is sent to the cloud. Various core capabilities provided include file and data transfer, store and forward, local data store and access, sensor data aggregation, edge analytics, certificate management, device provisioning, device decommissioning, and configuration management.

As described briefly above, the IIoT machine 104 can be deployed in various different ways. These include on the gateway, on controllers, or on sensor nodes. The gateway acts as a smart conduit between the IIoT cloud 106 and the asset(s) 102. The IIoT machine 104 may be deployed on the gateway device to provide connectivity to asset(s) 102 via a variety of protocols.

The IIoT machine 104 can be deployed directly onto machine controller units. This decouples the machine software from the machine hardware, allowing connectivity, upgradability, cross-compatibility, remote access, and remote control. It also enables industrial and commercial assets that have traditionally operated standalone or in very isolated networks to be connected directly to the IIoT cloud 106 for data collection and live analytics.

The IIoT machine 104 can be deployed on sensor nodes. In this scenario, the intelligence lives in the IIoT cloud 106 and simple, low-cost sensors can be deployed on or near the asset(s) 102. The sensors collect machine and environmental data and then backhaul this data to the IIoT cloud 106 (directly or through an IIoT gateway), where it is stored, analyzed, and visualized.

Customers or other users may create applications to operate in the IIoT cloud 106. While the applications reside in the IIoT cloud 106, they may rely partially on the local IIoT machines 104 to provide the capabilities to gather sensor data, process it locally, and then push it to the IIoT cloud 106.

The IIoT cloud 106 enables the IIoT by providing a scalable cloud infrastructure that serves as a basis for platform-as-a-service (PaaS), which is what developers use to create Industrial Internet applications for use in the IIoT cloud.

Referring back to FIG. 1, services provided by the IIoT cloud and generally available to applications designed by developers include asset services from asset module 108A, analytics services from analytics module 108B, data services from data module 108C, application security services from security module 108D, and operational services from operations module 108E.

Asset services include services to create, import, and organize asset models and their associated business rules. Data services include services to ingest, clean, merge, and ultimately store data in the appropriate storage technology so that it can be made available to applications in the manner most suitable to their use case.

Analytics services include services to create, catalog, and orchestrate analytics that will serve as the basis for applications to create insights about industrial assets. Application security services include services to meet end-to-end security requirements, including those related to authentication and authorization.

Operational services enable application developers to manage the lifecycle and commercialization of their applications. Operational services may include development operational services, which are services to develop and deploy Industrial Internet applications in the cloud, as well as business operational services, which are services that enable transparency into the usage of Industrial Internet applications so that developers can ensure profitability.

The asset model may be the centerpiece of many, if not all, Industrial Internet applications. While assets are the instantiations of asset types (types of industrial equipment, such as turbines), the asset model is a digital representation of the asset's structure. In an example embodiment, the asset service provides Application Program Interfaces (APIs), such as Representational State Transfer (REST) APIs that enable application developers to create and store asset models that define asset properties, as well as relationships between assets and other modeling elements. Application developers can then leverage the service to store asset-instance data. For example, an application developer can create an asset model that describes the logical component structure of all turbines in a wind farm and then create instances of that model to represent each individual turbine.

Developers can also create custom modeling objects to meet their own unique domain needs.

In an example embodiment, the asset module 108A may include an API layer, a query engine, and a graph database. The API layer acts to translate data for storage and query in the graph database. The query engine enables developers to use a standardized language, such as Graph Expression Language (GEL), to retrieve data about any object or property of any object in the asset service data store. The graph database stores the data.

An asset model represents the information that application developers store about assets, how assets are organized, and how they are related. Application developers can use the asset module 108A APIs to define a consistent asset model and a hierarchical structure for the data. Each piece of physical equipment may then be represented by an asset instance. Assets can be organized by classification and by any number of custom modeling objects. For example, an organization can use a location object to store data about where its pumps are manufactured, and then use a manufacturer object to store data about specific pump suppliers. It can also use several classifications of pumps to define pump types, assign multiple attributes, such as Brass or Steel, to each classification, and associate multiple meters, such as Flow or Pressure, to a classification.

The application security services provided by the security module 108D include user account and authentication (UAA) and access control. The UAA service provides a mechanism for applications to authenticate users by setting up a UAA zone. An application developer can bind the application to the UAA service and then use services such as basic login and logout support for the application, without needing to recode these services for each application. Access control may be provided as a policy-driven authorization service that enables applications to create access restrictions to resources based on a number of criteria.

Thus, a situation arises where application developers wishing to create industrial applications for use in the IIoT may wish to use common services that many such industrial applications may use, such as a log-in page, time series management, data storage, and the like. The way a developer can utilize such services is by instantiating instances of the services and then having their applications consume those instances. Typically, many services may be so instantiated.

Data services from the data module 108C enable Industrial Internet application developers to bring data into the system and make it available for their applications. This data may be ingested via an ingestion pipeline that allows for the data to be cleansed, merged with data from other data sources, and stored in the appropriate type of data store, whether it be a time series data store for sensor data, a Binary Large Object (BLOB) store for medical images, or a relational database management system (RDBMS).

Since many of the assets are industrial in nature, much of the data that will commonly be brought into the IIoT system 100 for analysis is sensor data from industrial assets. In an example embodiment, a time series service may provide a query efficient columnar storage format optimized for time series data. As the continuous stream of information flows from sensors and needs to be analyzed based on the time aspect, the arrival time of each stream can be maintained and indexed in this storage format for faster queries. The time series service also may provide the ability to efficiently ingest massive amounts of data based on extensible data models. The time series service capabilities address operational challenges posed by the volume, velocity, and variety of IIoT data, such as efficient storage of time series data, indexing of data for quick retrieval, high availability, horizontal scalability, and data point precision.

FIG. 3A-3C are representations of a data container 300 for transporting and storing IIoT data 320, in accordance with an example embodiment. The data 320 may be produced by a sensor, generated by the IIoT machine 104, and the like. In order to ensure that data 320 is not maliciously or erroneously changed, a watermark, such as a signature 316, is added to the data container 300. In one example embodiment, the signature 316 is added to the data container 300 without changing the data content of the container. The signature 316 is generated, for example, by applying a hash function to the data content (i.e., data 320) of the data container 300. The signature 316 may be generated using a key in addition to the data 320. In one example embodiment, the signatures and keys are based on pretty good privacy (PGP) and GNU privacy guard (gpg) block ciphers. The signature 316 may be used to verify the integrity of the data 320 as the data container 300 traverses components within the IIoT and after retrieval of the data container 300 from a storage component. In one example embodiment, there is an asset bootstrap process to enable the key store to obtain the key; a keychain is maintained to give to the components, including assets and cloud components.

As illustrated in FIG. 3A, the data 320 is wrapped in the data container 300 prior to transport. The data container 300 includes a header 304 that contains metadata associated with the data container 300. The header 304 includes the signature 316 and a source identifier 308 that identifies the source of the data 320, such as the name of the sensor that produced the data 320. For example, the source identifier may be zone.asset.id.632, as illustrated in FIG. 4B. The header 304 may also contain a timestamp 312 indicating the time that the data 320 was produced or the time that the data container 300 was created.

As the data container 300 traverses components of the IIoT, such as the IIoT machine 104, the machine gateway (M2M) 202, and the like, a component section 324 may be added to the header 304 for each traversed component. As illustrated in FIG. 3B, the component section 324 may include a component identifier 328 that identifies the corresponding component, an optional timestamp 332 that indicates the time the data 320 (or the data container 300) was modified by the corresponding component, a component signature 336, or any combination thereof. The component signature 336 may be a copy of the signature 316, may be generated by applying a hash function to the data 320 (as modified, supplemented, or both by the component), or may be generated by applying a hash function to the original data 320. The signature 336 may also be generated using a hash function and a key. As illustrated in FIG. 3C, additional component sections, such as component section 340, may be added to the header 304 as the data container 300 traverses additional components of the IIoT.

Figure 3D:
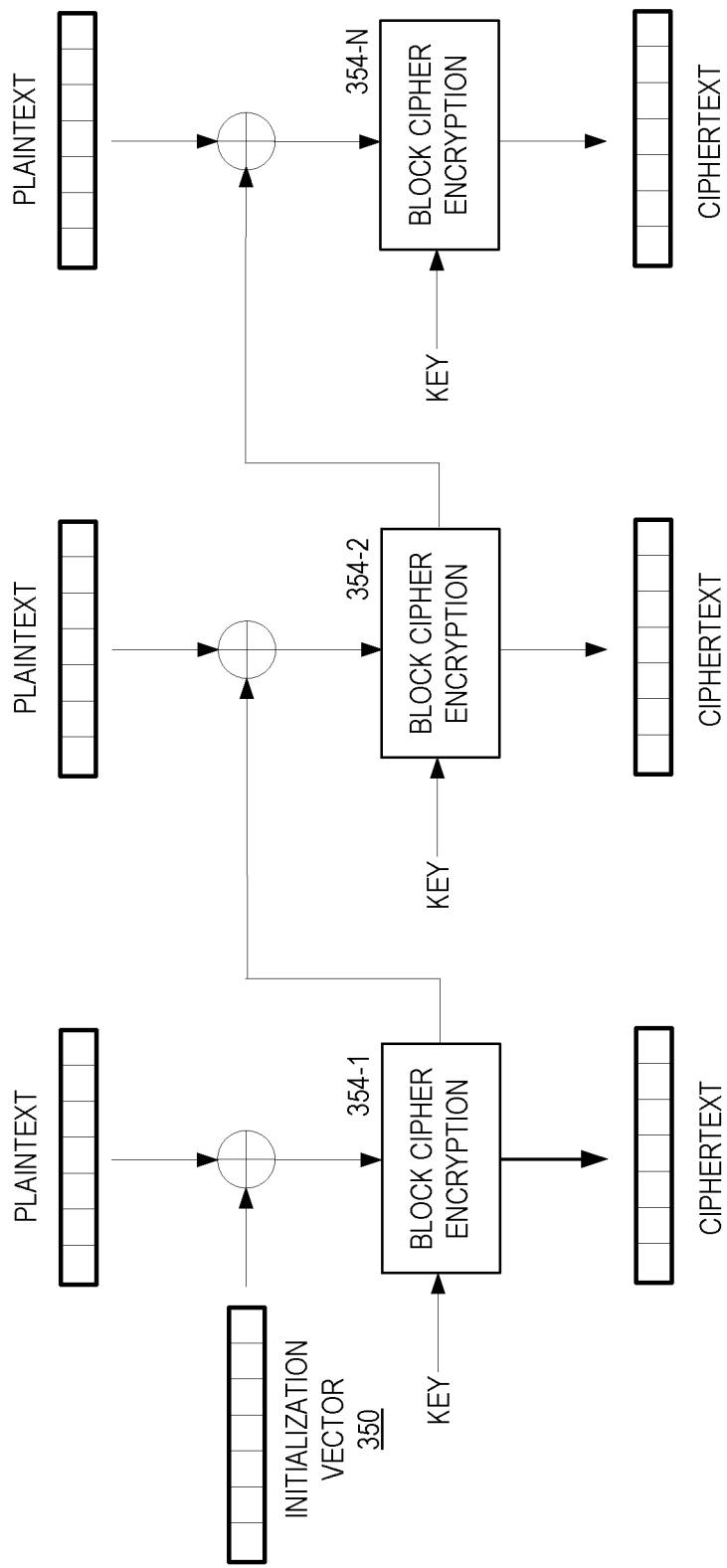
FIG. 3D illustrates an example technique for performing cipher block chaining (CBC) mode encryption, in accordance with an example embodiment.

FIG. 3D illustrates an example technique for performing cipher block chaining (CBC) mode encryption, in accordance with an example embodiment. In general, a signature is generated on a hash of the data using a key and may be generated based on the CBC mode encryption of FIG. 3D. In the example of FIG. 3D, the function may be defined by the equation:

$$E_k(P) := E(K,P) : \{0,1\}^k \times \{0,1\}^n \rightarrow \{0,1\}^n$$

For any block cipher and key, the function $E_k$ is to be a bijective function.

An initialization vector 350 is a cryptographic primitive of a specified length. In one example embodiment, the value(s) of the initialization vector 350 and the length of the initialization vector 350 are random or pseudorandom. Each block cipher encryption unit 354 encrypts a fixed-length group of bits, called a block, using a deterministic algorithm. A key specifies an unvarying transformation of the data.

Returning to FIG. 3B, the component identifiers 328 within the header 304 may be used to determine or verify the sequence of components that the data container 300 passed through within the IIoT. The data container 300 may be stored with the metadata, including the source identifier 308, the signature 316, the component identifier(s) 328, the component signature(s) 336, the timestamp(s) 312, 332, or any combination thereof, in order to verify the integrity of the data 320 and to perform path determination or path verification when the data is accessed in the future.

In one example embodiment, the data 320 from a sensor, such as a sensor measuring the power generated by a wind turbine, is collected by, for example, the IIoT machine 104. The IIoT machine 104 wraps the data 320 in a data container 300 and adds the source identifier 308, the timestamp 312, and the signature 316 to the data container 300. The data container 300 is transferred from the IIoT machine 104 to, for example, the machine gateway (M2M) 202. In one example embodiment, the data container 300 is transferred from the IIoT machine 104 directly a data collector and then to the machine gateway (M2M) 202. In either case, the data collector, the machine gateway (M2M) 202, or both may add a component section 324 to the header 304 of the data container 300.

In one example embodiment, components that receive the data 320 obtained from the data container 300 may verify the source signature 316, the component signature(s) 336, or both. For example, an analytics component may perform an on-the-fly (in-flight) analysis of the data 320. In addition, a stored data container 300 may be retrieved to perform post-flight analysis in order to generate, for example, historic analytics. A component that receives the data container 300 may also verify the path of components traversed by the data container 300, as described by way of example in conjunction with FIG. 6.

In one example embodiment, if the data container 300 is determined to have a data integrity issue, the data container 300 is stored in a buffer component where it can be accessed by a user for evaluation. The data integrity issue may be an error in the data 320, an error in the signature 316, an error in the signature 326, an unexpected traversal of a component, and the like. In this capacity, the buffer component may have different channels, also known as topics herein, that behave similar to a folder in a file system. An errors channel may be dedicated to storing metadata associated with the compromised data container 300. The errors channel may be segmented into a number of partitions. Partitions are configured to be read simultaneously in order to enable fast access to metadata within the errors channel.

Figure 4A:
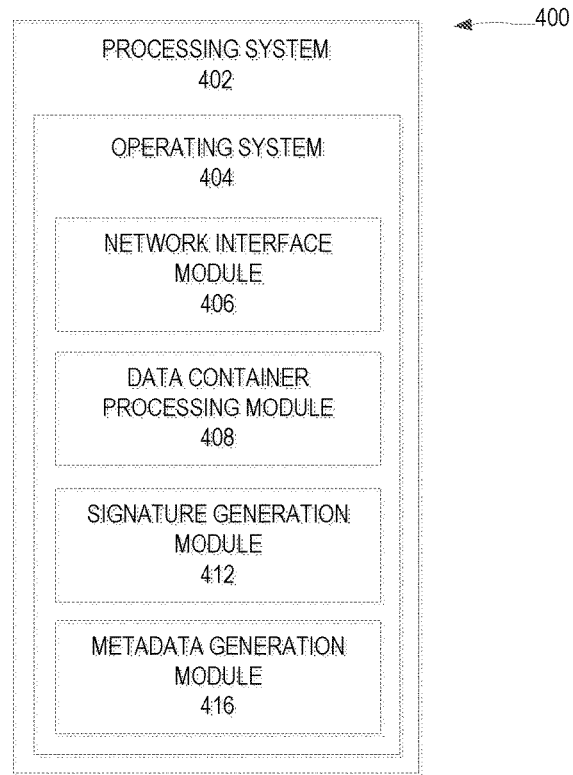
FIG. 4A is a block diagram of an example apparatus for generating or modifying the data container, in accordance with an example embodiment.
Figure 4B:
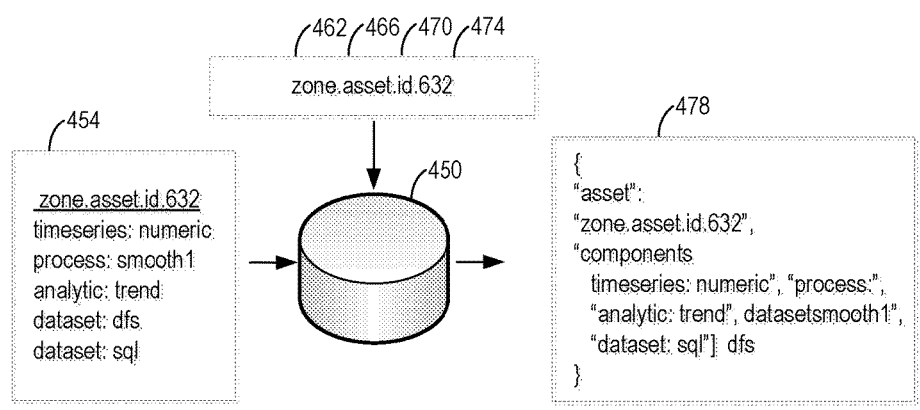
FIG. 4B is a dataflow diagram for storing and retrieving the data container in an asset management system, in accordance with an example embodiment.

FIG. 4A is a block diagram of an example apparatus 400 for generating or modifying the data container 300, in accordance with an example embodiment. For example, the apparatus 400 may be used to modify the data container 300 in the IIoT machine 104.

The apparatus 400 is shown to include a processing system 402 that may be implemented on a server 112, client 104, or other processing device that includes an operating system 404 for executing software instructions. In accordance with an example embodiment, the apparatus 400 may include, a data container processing module 406, a signature generation module 410, a metadata generation module 414, and a network interface module 418.

The data container processing module 406 generates or modifies the data container 300. The data container processing module 406 parses a received data container 300 in order to access the data 320 and the metadata in the header 304. The data container processing module 406 modifies the data container 300, as described below by way of example in conjunction with FIG. 5, and verifies the path of components traversed by the data container 300, as described below by way of example in conjunction with FIG. 6.

The signature generation module 410 generates the signature 316 and the component signature 336 for the data container 300 based on the data 320. The signature 316 and the component signature 336 may be generated, for example, by applying a hash function to the data 320. The signature 316 and the component signature 336 may be generated using a key in addition to the hash function.

The metadata generation module 414 utilizes the source identifier 308, the timestamp 312, and the signature 316 to generate the header 304. The metadata generation module 414 also generates the component section 324 for the header 304 of the data container 300. The metadata generation module 414 generates the component section 324 using the signature 316 or the component signature 336 generated by the signature generation module 410, using the identifier assigned to the apparatus 400, and using the timestamp associated with the data 320 or the data container 300.

The network interface module 418 provides an interface to the IIoT and enables the apparatus 400 to transmit and receive data containers 300 to/from the IIoT. The network may be based on wired communications, wireless communications, cellular communications, near field communications, Bluetooth® communications (e.g., Bluetooth® Low Energy), Wi-Fi® communications, and other communications. the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks.

FIG. 4B is a dataflow diagram for storing and retrieving the data container 300 in an asset management system 450, in accordance with an example embodiment. Metadata 454 describing the asset is stored in the asset management system 450. For example, metadata 454 may be stored in a row of a database table of the asset management system 450. The asset may be associated with an identifier 458 comprising a zone identifier 462, an asset identifier 466, an instance identifier 470, and an optional identifier 474. The zone identifier 462 is the tenant or unique zone identifier for the associated asset. The asset identifier 466 is the model or serial number of the asset. The instance identifier 470 is the identifier assigned to the asset model and may be related to the version of the asset model. The optional identifier 474 is an optional extra identifier, such as a location, a version number, and the like, that may be used to identify the asset.

The metadata 454 may be retrieved from the asset management system 450 using the identifier 458. For example, in order to verify the path of components traversed by the data container 300, the retrieved metadata 478, which includes an identification of an expected path of data from the corresponding asset, may be retrieved from the asset management system 450. As shown in the retrieved metadata 478, the data container 300 traversed an analytics component and a data smoothing component. The data container 300 also traversed a "timeseries:numeric" element that maps to, for example, the following components: a gateway component, a pipeline-stream component, a pipeline-parser component, a pipeline-timeseries component, and a timeseries-db component.

Figure 5:
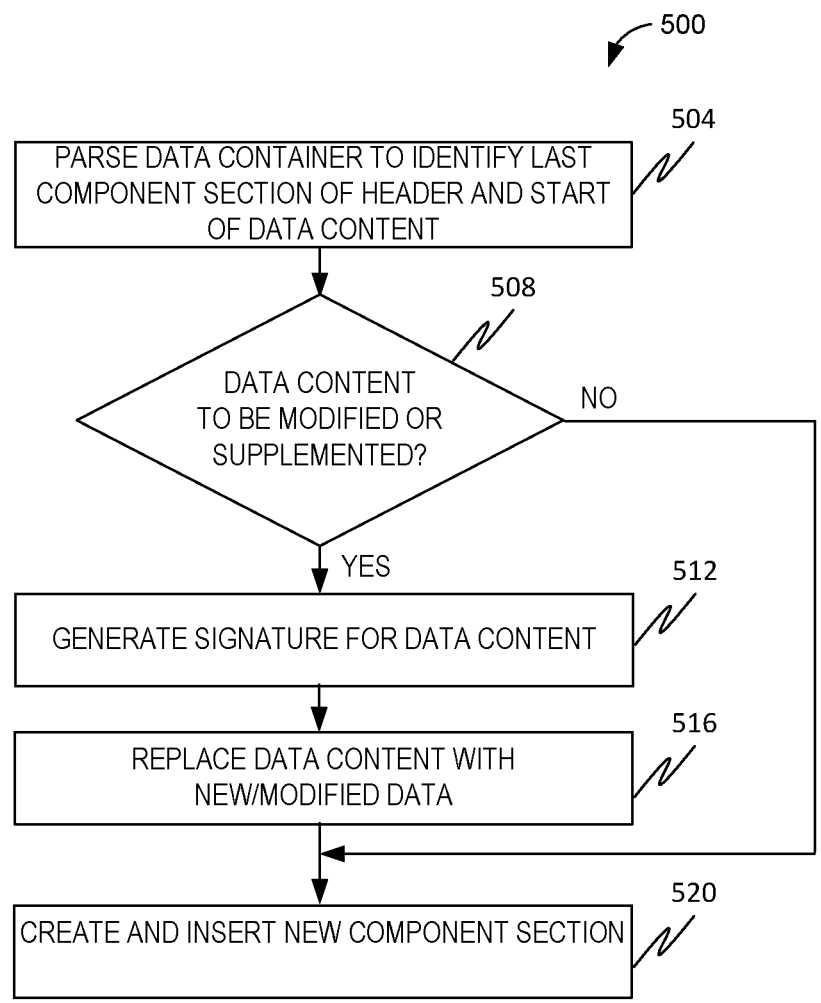
FIG. 5 is a flowchart for an example method for modifying the data container, in accordance with an example embodiment.

FIG. 5 is a flowchart for an example method 500 for modifying the data container 300, in accordance with an example embodiment. In one example embodiment, one or more of the operations of the method 500 may be performed by the data container processing module 406, the signature generation module 410, and the metadata generation module 414.

A data container 300 received by a component of the IIoT is parsed to identify the last component section 324 of the header 304 and the corresponding start of the data 320 (operation 504). The last section 324 of the header 304 may be identified by an end of header field, by a section count embedded in the header 304 (that indicates the number of component sections 324 contained in the header 304), by a header byte count embedded in the header 304, and the like. A test is performed to determine if the existing data 320 is to be modified, supplemented, or both (operation 508). If the existing data 320 is not to be modified or supplemented, the method 500 proceeds with operation 520 (using the existing signature 316); otherwise, a component signature 336 for the new data 320 (i.e., the data 320 that has been modified, supplemented, or both) is generated (operation 512). For example, a hash function and key may be utilized to generate the component signature 336 based on the new data 320. The existing data 320 in the data container 300 is replaced with the new data 320 (operation 516).

A new component section 324 is created and inserted into the header 304 based on the component identifier 328, the timestamp 332, and the component signature 336 (operation 520). The component signature 336 incorporated into the header 304 is the component signature 336 generated during operation 512 (if the data 320 has been modified, supplemented, or both) or the existing signature 316 (if the data 320 was not modified or supplemented). The method 500 then ends.

Figure 6:
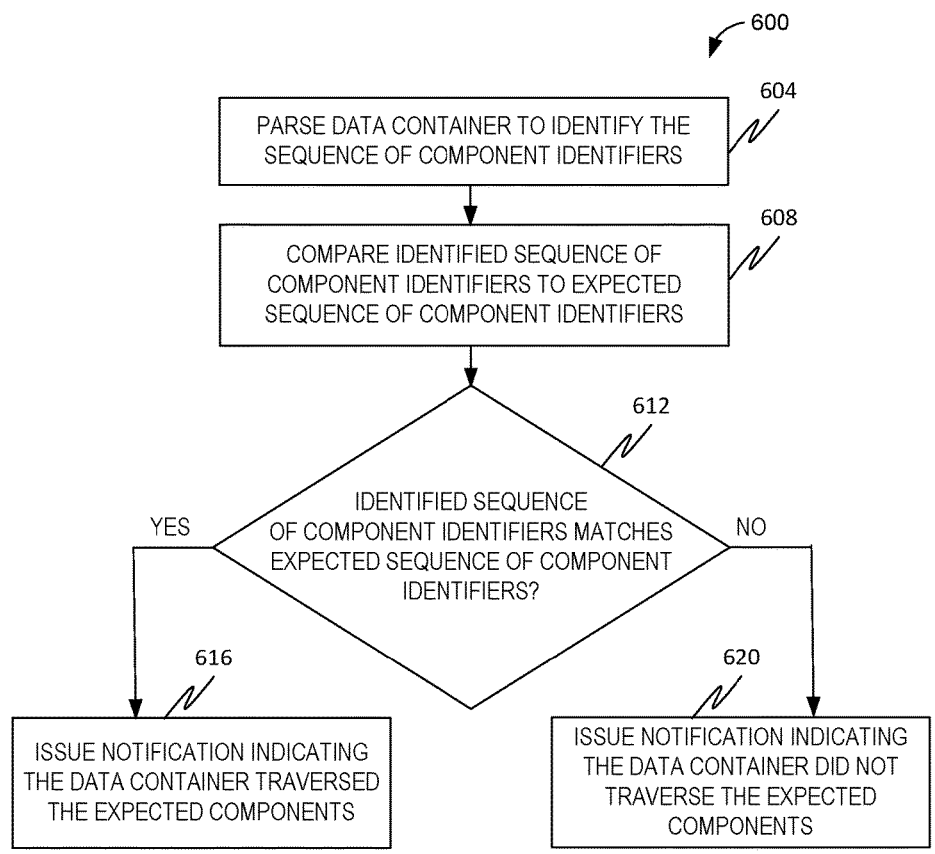
FIG. 6 is a for an example method for verifying a path of a data container, in accordance with an example embodiment.

FIG. 6 is a flowchart for an example method 600 for verifying a path of a data container 300, in accordance with an example embodiment. In one example embodiment, one or more of the operations of the method 600 may be performed by the data container processing module 406.

A data container 300 received by a component is parsed to identify the sequence of component identifiers 328 in the header 304 (operation 604). As noted above, the last component section 324 of the header 304 may be identified by an end of header field, by a section count embedded in the header 304 (that indicates the number of component sections 324 contained in the header 304), by a header byte count embedded in the header 304, and the like. The sequence of component identifiers 328 extracted from the header 304 is compared to an expected sequence of components identifiers 328 (operation 608). A test is performed to determine if the sequence of component identifiers 328 extracted from the header 304 matches the expected sequence of components identifiers 328 (operation 612). If the sequence of component identifiers 328 extracted from the header 304 matches the expected sequence of components identifiers 328, a notification is issued indicating that the data container 300 traversed the expected components (operation 616); otherwise, a notification is issued indicating that the data container 300 did not traverse the expected components (operation 620). The method 600 then ends. It is noted that, in the case of the example of FIG. 4B, the data container 300 traverses a "timeseries:numeric" element that maps to the following components: a gateway component, a pipeline-stream component, a pipeline-parser component, a pipeline-timeseries component, and a timeseries-db component. Each of the cited components may insert a corresponding component identifier 328 in the header 304.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-6 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 7:
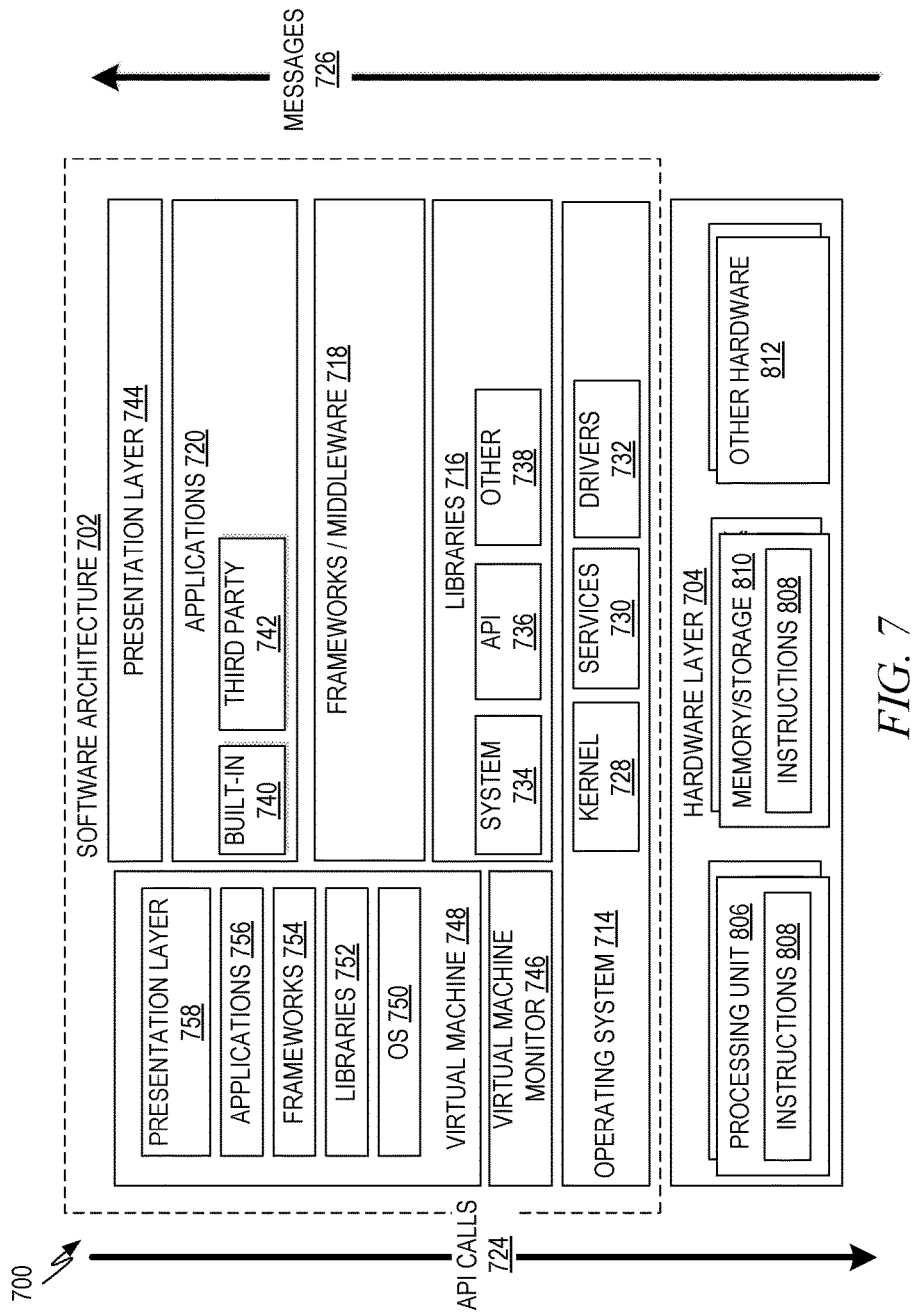
FIG. 7 is a block diagram illustrating a representative software architecture, which may be used in conjunction with various hardware architectures herein described.

FIG. 7 is a block diagram 700 illustrating a representative software architecture 702, which may be used in conjunction with various hardware architectures herein described. FIG. 7 is merely a non-limiting example of a software architecture 702, and it will be appreciated that many other architectures may be implemented to facilitate the functionality described herein. The software architecture 702 may be executing on hardware such as a machine 800 of FIG. 8 that includes, among other things, processors 810, memory/storage 830, and I/O components 850. A representative hardware layer 704 is illustrated and can represent, for example, the machine 800 of FIG. 9. The representative hardware layer 704 comprises one or more processing units 706 having associated executable instructions 708. The executable instructions 708 represent the executable instructions of the software architecture 702, including implementation of the methods, modules, and so forth of FIGS. 5-6. The hardware layer 704 also includes memory and/or storage modules 710, which also have the executable instructions 708. The hardware layer 704 may also comprise other hardware 812, which represents any other hardware of the hardware layer 804, such as the other hardware illustrated as part of the machine 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke API calls 724 through the software stack and receive a response, returned values, and so forth illustrated as messages 726 in response to the API calls 724. The layers illustrated are representative in nature, and not all software architectures have all layers. For example, some mobile or special purpose operating systems may not provide a frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks/middleware 718 may provide a higher-level common infrastructure that may be utilized by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third-party application 742 may invoke the API calls 724 provided by the mobile operating system such as the operating system 714 to facilitate functionality described herein.

The applications 720 may utilize built-in operating system functions (e.g., kernel 728, services 730, and/or drivers 732), libraries (e.g., system libraries 734, API libraries 736, and other libraries 738), and frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures utilize virtual machines. In the example of FIG. 7, this is illustrated by a virtual machine 748. A virtual machine creates a software environment where applications/modules can execute as if they were executing on a hardware machine (such as the machine 800 of FIG. 8, for example). The virtual machine 748 is hosted by a host operating system (operating system 714 in FIG. 7) and typically, although not always, has a virtual machine monitor 746, which manages the operation of the virtual machine 748 as well as the interface with the host operating system (i.e., operating system 714). A software architecture executes within the virtual machine 748, such as an operating system 750, libraries 752, frameworks/middleware 754, applications 756, and/or a presentation layer 758. These layers of software architecture executing within the virtual machine 748 can be the same as corresponding layers previously described or may be different.

Example Machine Architecture and Machine-Readable Medium

Figure 8:
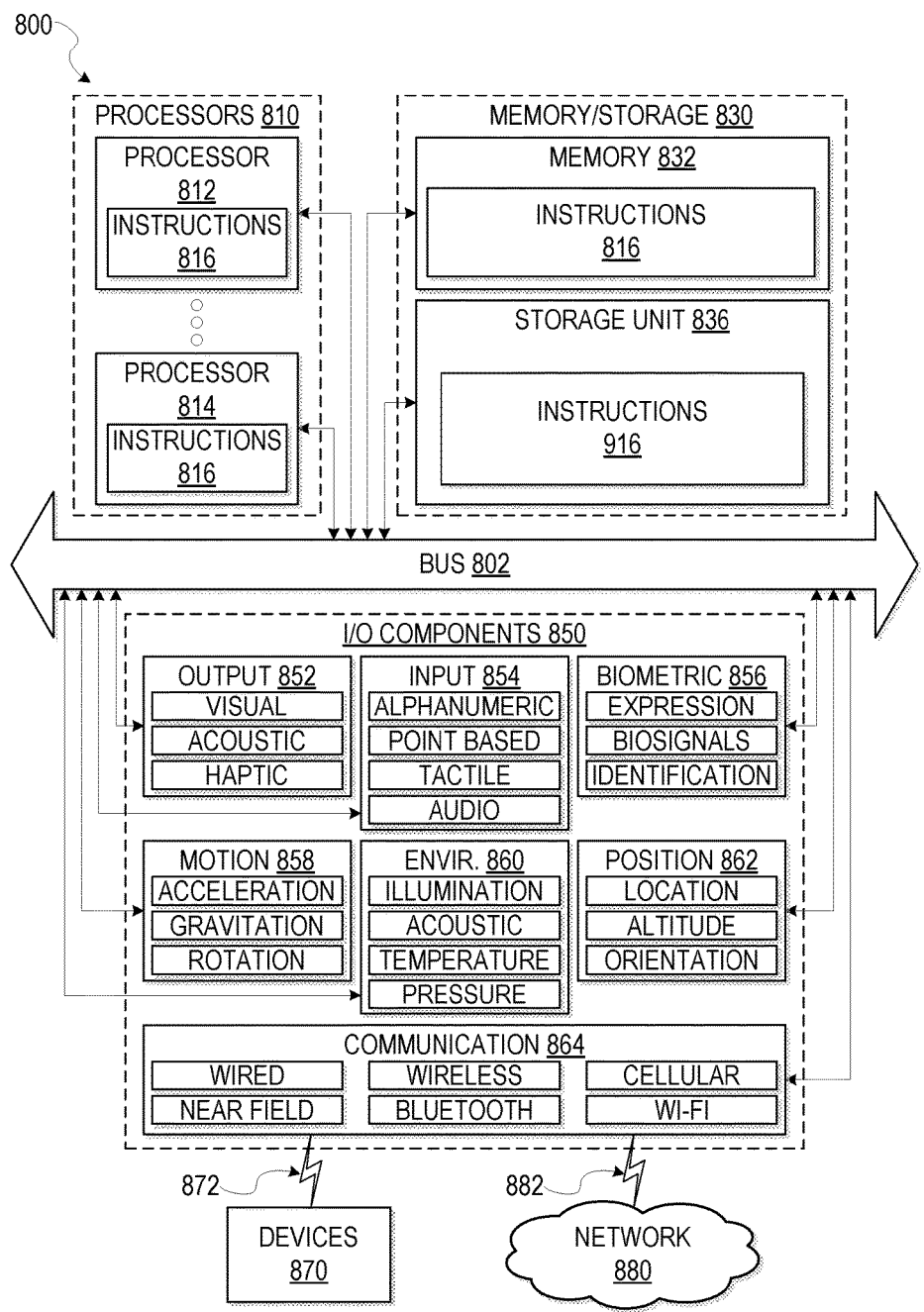
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 816 from a machine-readable medium (e.g., a machine-readable storage medium) and perform any one or more of the methodologies discussed herein. Specifically, FIG. 8 shows a diagrammatic representation of the machine 800 in the example form of a computer system, within which the instructions 816 (e.g., software, a program, an application, an applet, an app, or other executable code) for causing the machine 800 to perform any one or more of the methodologies discussed herein may be executed. For example, the instructions 816 may cause the machine 800 to execute the flow diagrams of FIGS. 5-6. Additionally, or alternatively, the instructions 816 may implement modules of FIG. 1, and so forth. The instructions 816 transform the general, non-programmed machine 800 into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 812 and a processor 814 that may execute the instructions 816. The term "processor" is intended to include a multi-core processor 812, 814 that may comprise two or more independent processors 812, 814 (sometimes referred to as "cores") that may execute the instructions 816 contemporaneously. Although FIG. 8 shows multiple processors 810, the machine 800 may include a single processor 812, 814 with a single core, a single processor 812, 814 with multiple cores (e.g., a multi-core processor 812, 814), multiple processors 812, 814 with a single core, multiple processors 812, 814 with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the cache memory of processor 812, 814), or any suitable combination thereof, during execution thereof by the machine 800. Accordingly, the memory 832, the storage unit 836, and the memory of the processors 810 are examples of machine-readable media.

As used herein, "machine-readable medium" means a device able to store the instructions 816 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine 800 will depend on the type of machine 800. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A method comprising:

receiving, at an intermediate hardware component, a data container structure comprising a payload including time-series data acquired by a source hardware component from an operation performed by an industrial asset, and a header that includes a source identifier of the source hardware component that uniquely identifies the source hardware component, and an asset identifier that uniquely identifies the industrial asset;

generating, by the intermediate hardware component, a hash of the payload including the time-series data acquired from the operation performed by the industrial asset;

watermarking, by the intermediate hardware component, the data container structure by inserting a signature of the intermediate hardware component based on the hash of the payload generated by the intermediate hardware component, and an identifier of the intermediate hardware component that uniquely identifies the intermediate hardware component into the header, wherein the asset identifier, the source identifier, and the identifier of the intermediate hardware component combine to provide an indication of an Industrial Internet of Things (IIoT) network path traveled by the data container structure; and transmitting, at the intermediate hardware component, the modified data container structure to a next hardware component within the IIoT network.

2. The method of claim 1, wherein the data container structure further includes a source signature based on the data and a source key.

3. The method of claim 1, further comprising modifying the data container structure to include a timestamp generated by the intermediate hardware component.

4. The method of claim 1, further comprising modifying the data in the data container structure.

5. The method of claim 4, wherein the inserted signature is based on the modified data and a component key.

6. The method of claim 1, wherein the inserted signature is based on a component key and the data contained in the data container structure.

7. The method of claim 1, further comprising:
obtaining an identification of an expected path of the data container structure through the IIoT network, the expected path being defined by one or more component identifiers;
parsing a header of the data container structure to extract a list of one or more component identifiers;
comparing the list of one or more component identifiers and the expected path of the data container structure; and
issuing a notification based on a result of the comparison.

8. An apparatus comprising:
a processor;
memory to store instructions that, when executed by the processor cause the processor to perform operations comprising:
receiving, at an intermediate hardware component, a data container structure comprising a payload including time-series data acquired by a source hardware component from an operation performed by an industrial asset, and a header that includes a source identifier of the source hardware component that uniquely identifies the source hardware component, and an asset identifier that uniquely identifies the industrial asset;
generating, by the intermediate hardware component, a hash of the payload including the time-series data acquired from the operation performed by the industrial asset;
watermarking, by the intermediate hardware component, the data container structure by inserting a signature of the intermediate hardware component based on the hash of the payload generated by the intermediate hardware component, and an identifier of the intermediate hardware component that uniquely identifies the intermediate hardware component into the header, wherein the asset identifier, the source identifier, and the identifier of the intermediate hardware component combine to provide an indication of an Industrial Internet of Things (IIoT) network path traveled by the data container structure; and
transmitting, at the intermediate hardware component, the modified data container structure to a next hardware component within the IIoT network.

9. The apparatus of claim 8, wherein the data container structure further includes a source signature based on the data and a source key.

10. The apparatus of claim 8, wherein the operations further comprise modifying the data container structure to include a timestamp generated by the intermediate hardware component.

11. The apparatus of claim 8, wherein the operations further comprise modifying the data in the data container structure.

12. The apparatus of claim 11, wherein the inserted signature is based on the modified data and a component key.

13. The apparatus of claim 8, wherein the inserted signature is based on a component key and the data contained in the obtained data container structure.

14. A non-transitory machine-readable storage medium comprising instructions that, when executed by one or more processors of a machine, cause the machine to perform operations comprising:
receiving, at an intermediate hardware component, a data container structure comprising a payload including time-series data acquired by a source hardware component from an operation performed by an industrial asset, and a header that includes a source identifier of the source hardware component that uniquely identifies the source hardware component, and an asset identifier that uniquely identifies the industrial asset;
generating, by the intermediate hardware component, a hash of the payload including the time-series data acquired from the operation performed by the industrial asset;
watermarking, by the intermediate hardware component, the data container structure by inserting a signature of the intermediate hardware component based on the hash of the payload generated by the intermediate hardware component, and an identifier of the intermediate hardware component that uniquely identifies the intermediate hardware component into the header, wherein the asset identifier, the source identifier, and the identifier of the intermediate hardware component combine to provide an indication of an Industrial Internet of Things (IIoT) network path traveled by the data container structure; and
transmitting, at the intermediate hardware component, the modified data container structure to a next hardware component within the IIoT network.

15. The non-transitory machine-readable storage medium of claim 14, wherein the data container structure further includes a source signature based on the data and a source key.

16. The non-transitory machine-readable storage medium of claim 14, wherein the operations further comprise modifying the data container structure to include a timestamp generated by the intermediate hardware component.

17. The non-transitory machine-readable storage medium of claim 14, wherein the operations further comprise modifying the data in the data container structure.

18. The non-transitory machine-readable storage medium of claim 17, wherein the inserted signature is based on the modified data and a component key.

19. The non-transitory machine-readable storage medium of claim 14, wherein the inserted signature is based on a component key and the data contained in the obtained data container structure.

20. The method of claim 1, wherein the source hardware component comprises a sensor which senses time series data generated by operation of the industrial asset, the source identifier comprises a unique identifier of the sensor within the IIoT network, and the asset identifier comprises a unique identifier of the industrial asset within the IIoT network.

\* \* \* \* \*